US011263305B2

(12) United States Patent
Bengtson (10) Patent No.: US 11,263,305 B2
(45) Date of Patent: Mar. 1, 2022

(54) MULTILAYERED APPROACH TO PROTECTING CLOUD CREDENTIALS

(71) Applicant: Netflix, Inc., Los Gatos, CA (US)

(72) Inventor: William Bengtson, Campbell, CA (US)

(73) Assignee: Netflix, Inc., Los Gatos, CA (US)

( * ) Notice: Subject to any disclaimer, the term of this patent is extended or adjusted under 35 U.S.C. 154(b) by 116 days.

(21) Appl. No.: 16/393,958

(22) Filed: Apr. 25, 2019

(65) Prior Publication Data

US 2019/0347404 A1   Nov. 14, 2019

Related U.S. Application Data

(60) Provisional application No. 62/756,460, filed on Nov. 6, 2018, provisional application No. 62/669,313, filed on May 9, 2018.

(51) Int. Cl.
*G06F 21/45* (2013.01)
*H04L 29/06* (2006.01)
(Continued)

(52) U.S. Cl.
CPC .......... *G06F 21/45* (2013.01); *H04L 63/0281* (2013.01); *H04L 63/0823* (2013.01);
(Continued)

(58) Field of Classification Search
CPC . G06F 21/45; H04L 63/0281; H04L 63/0823; H04L 63/0876; H04L 63/10;
(Continued)

(56) References Cited

U.S. PATENT DOCUMENTS 7,453,852 B2 * 11/2008  Buddhikot ........ H04L 29/12358
                                                370/331
8,619,779 B2 * 12/2013  Li ......................... H04L 45/04
                                                370/392
(Continued)

FOREIGN PATENT DOCUMENTS

CA      3 097 671 A1   11/2019
WO   2019/217595 A1   11/2019

OTHER PUBLICATIONS

Darvinder Kaur and Sonampreet Kaur, "Securing Network using Network Access Control, User and Resource Management, and Location-based Security", International Journal of Computer Applications (0975-8887) vol. 46—No. 21, pp. 27-30, May 2012 (Year: 2012).*

(Continued)

*Primary Examiner* — Catherine Thiaw
(74) *Attorney, Agent, or Firm* — FisherBroyles, LLP (57) ABSTRACT

The disclosed computer-implemented method may include mapping an internal network to identify various nodes of the internal network. The method may further include determining where at least some of the internal network nodes identified in the mapping are located. The method may also include receiving a request for metadata service information from an application hosted on a cloud server instance. The method may then include providing a response to the received request for metadata service information if the determined location of the requesting node is approved or preventing a response to the received request for metadata service information if the determined location of the requesting node is not approved. Various other methods, systems, and computer-readable media are also disclosed.

20 Claims, 4 Drawing Sheets

(51) Int. Cl.
    *H04L 67/51*     (2022.01)
    *H04L 67/566*     (2022.01)

(52) U.S. Cl.
    CPC .......... *H04L 63/0876* (2013.01); *H04L 63/10* (2013.01); *H04L 63/1491* (2013.01); *H04L 63/20* (2013.01); *H04L 67/16* (2013.01); *H04L 67/2833* (2013.01); *H04L 63/101* (2013.01)

(58) Field of Classification Search
    CPC ... H04L 63/1491; H04L 63/20; H04L 63/101; H04L 67/16; H04L 67/2833
    See application file for complete search history.

(56) References Cited

U.S. PATENT DOCUMENTS

| | | | | |
|---|---|---|---|---|
| 8,655,773 | B1* | 2/2014 | Fasoli | G06Q 40/00 705/38 |
| 9,288,193 | B1 | 3/2016 | Gryb et al. | |
| 9,521,606 | B1* | 12/2016 | Costa | H04W 4/029 |
| 2008/0109362 | A1* | 5/2008 | Fransdonk | H04W 4/021 705/51 |
| 2009/0094682 | A1* | 4/2009 | Sage | G06F 21/6218 726/4 |
| 2010/0134299 | A1* | 6/2010 | Fitzgerald | G06F 21/88 340/573.1 |
| 2012/0042163 | A1 | 2/2012 | Goodman et al. | |
| 2012/0144023 | A1* | 6/2012 | Guest | H04L 61/1511 709/224 |
| 2012/0173732 | A1* | 7/2012 | Sullivan | G06F 1/183 709/226 |
| 2013/0219483 | A1* | 8/2013 | Cho | H04L 63/145 726/13 |
| 2014/0082350 | A1 | 3/2014 | Zarfoss, III et al. | |
| 2015/0095497 | A1* | 4/2015 | Caputo | H04L 41/12 709/226 |
| 2015/0142968 | A1* | 5/2015 | Bhagwat | H04L 67/16 709/224 |
| 2016/0105489 | A1* | 4/2016 | Llorca | G06F 9/50 709/226 |
| 2016/0119325 | A1* | 4/2016 | Doshi | H04L 67/04 726/7 |
| 2017/0063946 | A1* | 3/2017 | Quan | H04L 67/20 |
| 2017/0339070 | A1* | 11/2017 | Chang | H04L 47/829 |
| 2017/0339186 | A1 | 11/2017 | Gurvich et al. | |
| 2018/0007002 | A1* | 1/2018 | Landgraf | H04L 63/0263 |
| 2018/0007099 | A1* | 1/2018 | Ein-Gil | G06F 9/468 |
| 2018/0026944 | A1* | 1/2018 | Phillips | H04L 63/1433 726/4 |
| 2018/0115551 | A1* | 4/2018 | Cole | H04L 41/18 |
| 2018/0316764 | A1* | 11/2018 | Ferreira Gomes | H04W 28/02 |
| 2019/0342174 | A1* | 11/2019 | Kaneko | G06F 21/629 |
| 2019/0349369 | A1 | 11/2019 | Bengtson et al. | |
| 2019/0349405 | A1 | 11/2019 | Bengtson | |
| 2020/0053397 | A1* | 2/2020 | Zhou | H04L 67/1097 |
| 2020/0106748 | A1* | 4/2020 | Newell | H04W 12/001 |

OTHER PUBLICATIONS

Elisa Bertino and Michael Kirkpatrick, "Location-Aware Authentication and Access Control—Concepts and Issues", IEEE, pp. 10-15 (Year: 2009).*

Nils Ulltveit-Moe and Vladimir Oleshchuk, "Enforcing mobile security with location-aware role-based access control", Security and Communication Networks Security Comm. Networks 2016; 9:429-439 Published online Nov. 13, 2013 in Wiley Online Library (wileyonlinelibrary.com). DOI: 10.1002/sec.879 (Year: 2013).*

International Search Report and Written Opinion received for PCT Application Serial No. PCT/US2019/031387 dated Jul. 12, 2019, 11 pages.

Bengtson, William, "Advanced Metadata Proxy", U.S. Appl. No. 16/402,210 dated May 2, 2019, 58 pages.

Bengtson et al., "Detecting Credential Compromise In A Cloud Resource", U.S. Appl. No. 16/402,213 dated May 2, 2019, 68 pages.

International Preliminary Report on Patentability received for PCT Application Serial No. PCT/US2019/031387 dated Nov. 19, 2020, 9 pages.

* cited by examiner

MULTILAYERED APPROACH TO PROTECTING CLOUD CREDENTIALS

CROSS REFERENCE TO RELATED APPLICATION

This application claims priority to and the benefit of U.S. Provisional Patent Application No. 62/756,460, filed Nov. 6, 2018, and also claims priority to U.S. Provisional Patent Application No. 62/669,313, filed May 9, 2018, the disclosures of each of which are incorporated, in their entirety, by this reference.

BACKGROUND

In many cases, software applications are installed locally on electronic devices. In other cases, software applications may be hosted on the cloud and may not be installed locally on the electronic devices, or those devices may only have small, client-side applications that allow access to the cloud. Each of these cloud-hosted applications may be hosted on different cloud instances. These cloud instances are often referred to as "virtual private clouds" or VPCs. Organizations may set up VPCs to host applications for their users. Those users typically log in to the VPCs, providing credentials such as usernames and passwords or biometric information. Once logged in, the users may be able to access data and other resources provided by the cloud-hosted application. In some cases, the user's credentials may be static and may be valid indefinitely. In other cases, the user's credentials may be temporary and may lose their validity after a predefined period (e.g., 1-6 hours). Once the user's credentials have lost their validity, any access to applications hosted on the VPCs will be denied.

SUMMARY

As will be described in greater detail below, the present disclosure describes methods and systems for protecting credentials in a cloud environment by limiting locations from which specified requests may originate.

In one example, a computer-implemented method for protecting credentials in a cloud environment may include mapping an internal network to identify various nodes of the internal network. The method may further include determining where at least some of the internal network nodes identified in the mapping are located. The method may also include receiving a request for metadata service information from an application hosted on a cloud server instance. The method may then include providing a response to the received request for metadata service information if the determined location of the requesting node is approved. Or, the method may include preventing a response to the received request for metadata service information if the determined location of the requesting node is not approved.

In some examples, the method may further include generating a list that identifies those internal network nodes that were discovered during the mapping. The generated list may include network addresses for the nodes identified in the mapping.

In some examples, the metadata service information may include static information or dynamically changeable information. In some examples, the metadata service information may include credential information for the application. In some examples, the credential information for the application may allow the application to access various application programming interfaces (APIs) for services provided by the cloud server instance. In some examples, the method may further include determining the network location from which API calls are received and may allow or deny the API call based on the determined network location from which the API call was received.

In some examples, the location of the network nodes may be a physical location. In some examples, the location of the network nodes may be a logical location within the internal network. In some examples, the method may further include creating a managed policy that describes various regions within the internal network. In some examples, the regions may be designated within the managed policy as being approved or being not approved for receiving metadata service information.

In addition, a corresponding system for protecting credentials in a cloud environment may include at least one physical processor and physical memory comprising computer-executable instructions that, when executed by the physical processor, may cause the physical processor to: map at least a portion of an internal network to identify various nodes of the internal network, determine where the internal network nodes identified in the mapping are located, receive a request for metadata service information from an application hosted on a cloud server instance, and provide a response to the received request for metadata service information if the determined location of the requesting node is approved, or prevent a response to the received request for metadata service information if the determined location of the requesting node is not approved.

In some examples, mapping at least a portion of an internal network to identify nodes of the internal network may include defining various regions of the internal network. Each region of the internal network may include a network address translation (NAT) gateway address, a virtual private cloud (VPC) identifier, and/or a VPC endpoint identifier.

In some examples, providing a response to the request for metadata service information may be further conditioned on receiving valid, up-to-date credentials. In some examples, receiving a request for metadata service information from an application hosted on a cloud server instance may further include observing a public internet protocol (IP) address for the cloud server instance.

In some examples, receiving a request for metadata service information from an application hosted on a cloud server instance may further include observing a NAT gateway public IP address for the cloud server instance. In some examples, receiving a request for metadata service information from an application hosted on a cloud server instance may further include observing a private IP address for the cloud server instance. In some examples, the computer system may be further configured to observe which virtual private cloud the request for metadata service information came from for cloud instances deployed on an external subnet with a public IP address. In some examples, the computer system may be further configured to observe which virtual private cloud the request for metadata service information came from for cloud instances deployed on an internal subnet with a private IP address.

In some examples, the above-described method may be encoded as computer-readable instructions on a computer-readable medium. For example, a computer-readable medium may include one or more computer-executable instructions that, when executed by at least one processor of a computing device, may cause the computing device to map at least a portion of an internal network to identify various nodes of the internal network, determine where the internal network nodes identified in the mapping are located, receive a request for metadata service information from an application hosted on a cloud server instance, and provide a response to the received request for metadata service information if the determined location of the requesting node is approved, or prevent a response to the received request for metadata service information if the determined location of the requesting node is not approved.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to protecting credentials in a cloud environment. As will be explained in greater detail below, embodiments of the present disclosure may identify the location of nodes within an internal network. Once the location of these nodes has been determined, the systems described herein may analyze incoming requests for resources and may allow or deny the requests for services based on the location of the nodes within the network. In some cases, these requests for resources may be requests for information from a metadata service. In other cases, these requests for resources may be application programming interface (API) calls from applications. Regardless of which type of requests come in, the systems described herein may analyze and filter these requests and may only allow hose that are from specified locations within the network.

In at least some traditional cloud-hosting systems, VPC providers may allow requests for resources to come from substantially anywhere on earth. This may allow a whole host of malicious users to send requests directly or through API calls to services such as a metadata service. In some cases, these metadata services may provide credential information to users or applications. These credentials may be used to access cloud resources including application data, database tables, or other private information. As such, it may be beneficial to reduce the number of locations from which requests for metadata service information may be received. By reducing the number of locations from which such requests may be received, the systems described herein may curtail the number of potentially malicious users that have access to cloud systems and cloud-stored information. This may, in turn, keep legitimate user's data more secure and out of the hands of unwanted users.

Figure 1:
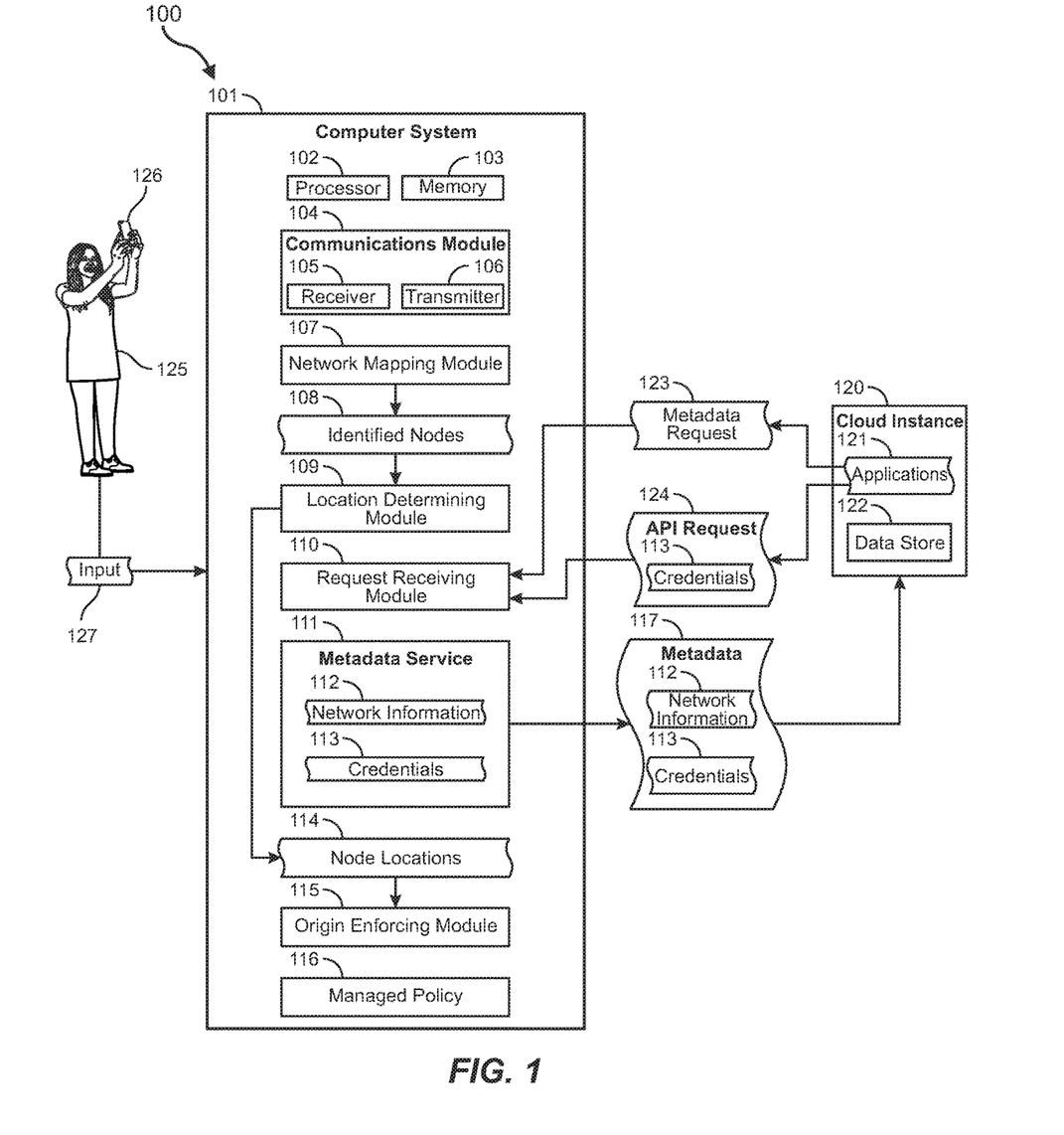
FIG. 1 illustrates a computing environment in which embodiments described herein may be implemented.

The following will provide, with reference to FIGS. 1-7, detailed descriptions of systems and methods for protecting credentials in a cloud environment. FIG. 1, for example, illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may further include a network mapping module 107. The network mapping module 107 may be configured to map a computer network and identify various nodes 108 within that network. The nodes may include mobile or stationary computing systems, server computers, gateways, routers, internet-of-things (IOT) devices, or other types of electronic devices. The location determining module 109 of computer system 101 may be configured to determine the location of these identified nodes 108. The "location," as the term is used herein, may refer to a physical location including a building, room, city, state, country, etc., and may include physical global positioning system (GPS) coordinates, or other physical location indicators. Additionally or alternatively, the location may refer to a logical location such as behind a firewall or outside of a firewall, behind or outside of a router, part of a specified set of internet protocol (IP) addresses or media access control (MAC) addresses, or part of some other logical grouping of nodes, or some other logical location identifier. Each of the identified nodes 108 may thus be classified with a node location 114, whether that location is physical, logical, or both.

The request receiving module 110 of computer system 101 may be configured to receive metadata requests. For example, request receiving module 110 may receive metadata request 123 from a cloud instance 120. The cloud instance 120 may be an instance of a private cloud or an instance of a public cloud and may include one or more server computer systems, one or more networking devices, one or more data storage systems (e.g., 122), or other cloud-related hardware. The cloud instance 120 may host one or more applications 121. These applications may be used, for example, by user 125, who may access and interact with these applications 121 (via input 127) using their mobile devices (e.g., 126). The applications 121 may be configured to send metadata requests 123 to computer system 101. The metadata requests 123 may request various kinds of information that is to be used in conjunction with the applications 121. This information may include network information 112, credential information 113, user profile information, application data, or other types of data.

In some cases, requests from the cloud instance 120 may come in the form of API requests 124. These API requests may include specific requests for application credentials 113. The metadata service 111 may then provide these credentials 113 to the cloud instance 120. In some embodiments, however, the origin enforcing module 115 of computer system 101 may determine where the metadata request 123 was received from. If the metadata request 123 did not originate from an approved network location, the request may be denied and the application 121 will not receive the requested credentials or other metadata. If the metadata request 123 did on the other hand, originate from an approved network location, the request may be allowed and the application may receive the requested credentials or other metadata information.

In some embodiments, the receiving module 110 and/or the origin enforcing module 115 may be part of or operated on the cloud instance 120. In such cases, the receiving module 110 and/or the origin enforcing module 115 may access API requests 124 sent by the applications 121 and determine whether the requests were sent from approved locations. For instance, when an application is making a request to a web server, a managed policy such as an Identity and Access Management (IAM) managed policy may maintain a whitelist that may be checked by the origin enforcing module 115. The origin enforcing module 115 may check that the API request came from within an environment defined by the IAM policy. If the API request 124 came from an approved location then the request receiving module would allow the request if the permissions were permitted. This process will be described in greater detail below initially with regard to FIGS. 2-3 and then with regard to method 400 of FIG. 4 and FIGS. 5-7.

Figure 2:
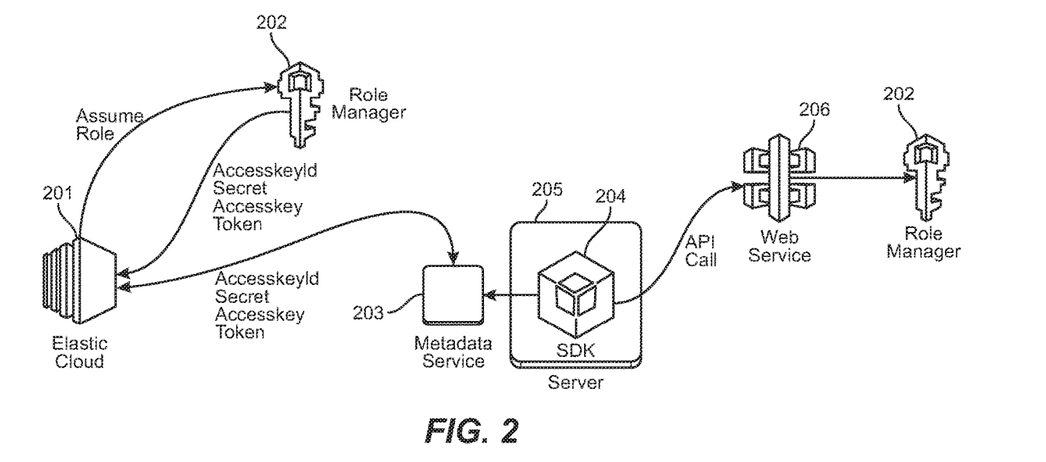
FIG. 2 illustrates a computing environment in which web services providers interact with a metadata service provider.

As shown in FIG. 2, various systems may be put into place to manage and distribute application credentials. As noted above, credential management systems may be designed to prevent credentials from being made available to unauthorized parties. The impact of exposed credentials may depend on the time of exposure, the skill of the individual with the credentials, and the privileges associated with the credentials. The combination of these can lead to anything from website defacement to a massive data breach where the businesses subjected to the breach may sustain heavy financial losses and may even be forced to discontinue business.

In the embodiments described herein, a "credential" may be any type of authentication data, token, or other indicator that is used to describe and/or make changes within an account (e.g., a web services account). In at least some of the embodiments herein, an entity (such as a user or business) may host one or more applications on the cloud. In FIG. 2, for example, these applications may be hosted on elastic cloud 201. These applications may need access to various cloud resources. Access to cloud resources may be controlled via metadata service 203 which may be designed to control access to network information and/or credentials. Some web service providers may provide the ability to assign permissions to a cloud instance through an identity and access management (IAM) role using a role manager 202. This role may be attached to a cloud instance (e.g., 201) through an instance profile, thus providing credentials to the underlying applications running on the cloud instance through the metadata service 203.

The metadata service 203 may be a service provided by an entity that itself is configured to provide information for web services (e.g., 206) or applications deployed on cloud servers. As noted above, this metadata service information may include network information, cloud instance identifiers, credentials, or other information. In some cases, the metadata service information may be read-only and static. Each process with network access may be able to communicate with the metadata service by default. The metadata service 203 may include information indicating which availability-zone the user is deployed in, the user's private IP address, user data with which the user launched the cloud instance, and the web service credentials that the application uses for making API calls to the web service provider. These credentials may be temporary session credentials that range in a validity from one to six hours (or more). When the expiration for the credentials nears, new session credentials may be generated and made available on the metadata service 203 for the application. This system may provide a substantially seamless experience with continuous access to web service APIs with limited-duration credentials. Software development kits (SDKs) 204 associated with the web service may be programmed to check the metadata service prior to credential expiration to retrieve the new set of dynamic credentials. The metadata service 203 may be accessible inside of the cloud instance 201 using a specified IP address or other identifier.

In some cases, the web service provider may provide a logging service that logs API calls made by each application using credentials of a certain user or entity. This logging service may enable governance compliance and auditing. The logging service may identify which entity made the API call and from which location the API call was made. Static or dynamic credentials may be associated with a user in the web services identity access and management (IAM) service 202. The IAM service 202 may allow a user to generate up to two sets of credentials per IAM user. At least in some cases, these credentials may be static and may never expire. As such, the credentials may need to be manually rotated. Because these credentials may never expire, some entities may avoid the use of these credentials to mitigate risk if a credential were to be exposed.

Temporary or session-based credentials may be used when operating in the cloud. If a session-based credential is exposed, the potential impact of exposure may be reduced as the credential will eventually expire. Web service providers may associate session-based credentials with IAM roles.

The lifecycle of credentials on cloud instances (e.g., 201) may be illustrated, at least partially, in FIG. 2. When a user launches a server 205 with an IAM role, the web service provider may create session credentials that are valid for a specified time period (e.g., 1-6 hours). The elastic cloud instance 201 may retrieve credentials from the metadata service 203 through an API call to a security token service (STS) that retrieves the temporary session credentials. These credentials may be passed on to the metadata service 203 that is relied upon by the cloud instance 201.

The web service SDK 204 may retrieve these credentials and use them when making API calls to web services 206. In the embodiments described herein, each API call may be evaluated by the IAM service (e.g., role manager 202) to determine if the role attached to the cloud instance 201 has permission to make that call and if the temporary credential is still valid. If the role has permission and the token has not expired, the call may succeed. On the other hand, if the role does not have the permission or the token has expired, the call may fail. The cloud instance 201 may handle renewal of the credentials and may replace them in the metadata service 203.

In at least some embodiments, each temporary credential that is issued by the STS service may be given an expiration timestamp. When an API call is issued, the role manager 202 may validate that the credentials are still valid (not expired) and check the signature. If both validate, the API call may then be evaluated to see if the role has the given permissions assigned. As indicated further in FIG. 3, API calls may come from a variety of locations. In the embodiments described herein, the location from which the API call originated may be evaluated and used as a basis for allowing or denying the request.

Figure 3:
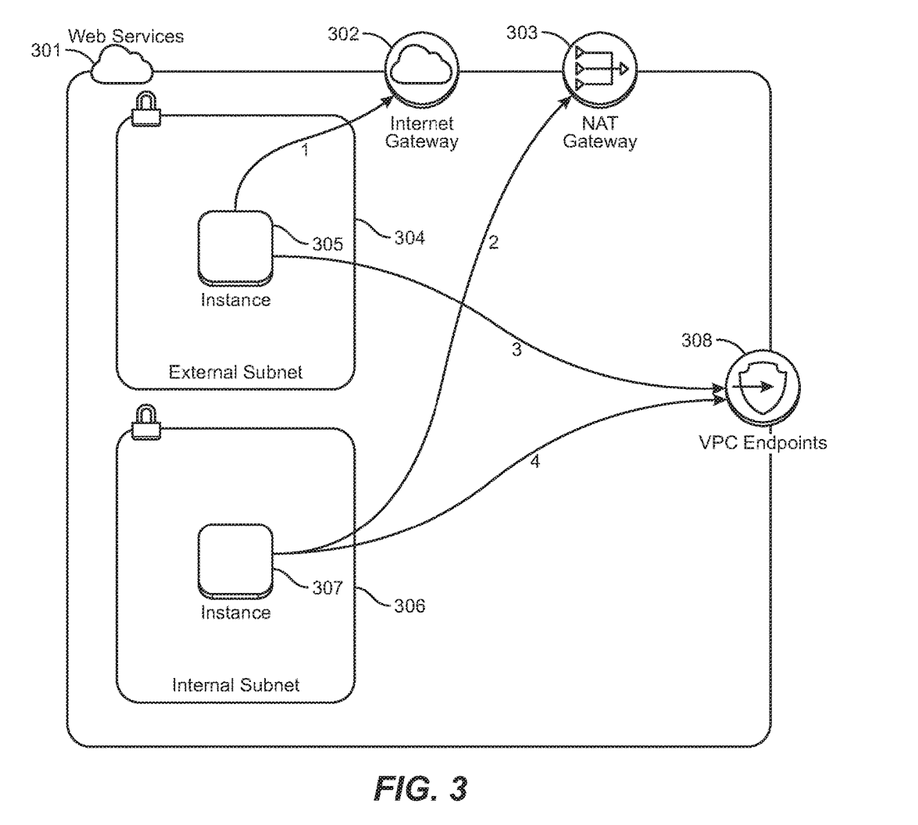
FIG. 3 illustrates a computing environment in which internal and external subnets within a network interact with a virtual private cloud (VPC).

FIG. 3 illustrates a networking environment in which API calls may originate from a variety of locations. At arrow 1, web services 301 may observe the public IP address of a user's cloud instance (e.g., 305) as the source IP address if the web services instance 305 instance is deployed in an external subnet (e.g., in a public network with a public IP address). This is because, at least in this embodiment, web services API calls may go directly to the internet 302. At arrow 2, web services 301 may observe the network address translation (NAT) gateway 303 public IP address as the source IP address. In such cases, a user's web services instance 307 may be deployed in an internal subnet 306 (e.g., a private network with no public IP address). This is because, at least in this embodiment, web services API calls may travel through the NAT Gateway 303 in order to get to a virtual private cloud (VPC) endpoint 308.

At arrow 3, web services 301 3 may observe the private IP address of a user's cloud instance as the source IP address and may also observe information about the VPC and/or VPC endpoint 308 the call went through if the user's web service instance 305 deployed in an external subnet 304 (e.g., a public network with a public IP address) makes a web services API call that goes through a VPC endpoint 308 or Private Link. At arrow 4, web services 301 may observe the private IP address of a user's cloud instance 307 as the source IP address as well as information about the VPC and/or VPC endpoint 308 the call went through if the user's web services cloud instance 307 deployed in an internal subnet 306 (e.g., a private network with no public IP address) makes a web services API call that goes through a VPC endpoint 308 or private link. Accordingly, in each of these four scenarios, the "location" of where an API call or metadata service request originates may be determined in a different manner.

As noted above, in at least some of the embodiments described herein, credentials may be enforced by only allowing API calls or other metadata service information requests to succeed if they originate from a known environment. In a web services environment, this may be achieved by creating an IAM policy that checks the origin of the API call. The systems described herein may be designed to create a managed policy or IAM policy that encompasses a user's entire account across all regions. To do this, the user may describe each region and collect NAT gateway IPs, VPC identifiers, and VPC endpoint IDs to create the policy language for the managed policy or IAM policy. These endpoints may then be attached to IAM Roles that are to be protected. In some cases, endpoints may be whitelisted using a managed policy attached to a role or the endpoint whitelisting may be applied in the IAM role policy itself. In some embodiments, the user's web service may be exposed publicly through a load balancer. This may allow the user to deploy their cloud instance into the internal subnet and allow the user to attach this policy to their IAM role.

Figure 4:
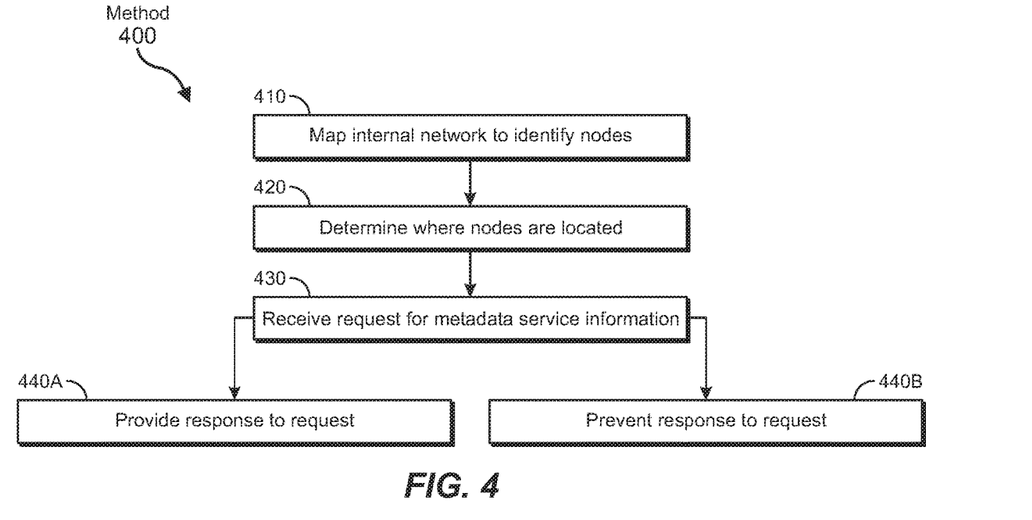
FIG. 4 illustrates a flow diagram of an exemplary method for protecting credentials in a cloud environment.

Turning now to FIG. 4, a flow diagram is provided of an exemplary computer-implemented method 400 for protecting credentials in a cloud environment. The steps shown in FIG. 4 may be performed by any suitable computer-executable code and/or computing system, including the system illustrated in FIG. 1. In one example, each of the steps shown in FIG. 4 may represent an algorithm whose structure includes and/or is represented by multiple sub-steps, examples of which will be provided in greater detail below.

As illustrated in FIG. 4, at step 410, one or more of the systems described herein may be implemented to protect credentials in a cloud environment. For example, a network mapping module may map a network such as network 500 of FIG. 5 to identify various nodes (e.g., 502) of the internal network. At step 420, the location determining module 109 of FIG. 1 may determine where at least some of the internal network nodes identified in the mapping are located. The network nodes 502 may include substantially any type of networking device or electronic computing device. The nodes at any given location (e.g., location 501A, location 501B, or location 501C) may be nodes of the same type or may be nodes of different types. The various locations 501A-501C may be different from each other and may be different physical locations, different logical locations, or a combination of physical and logical locations. The network mapping module 107 of FIG. 1 may map some or all of the nodes at each location 501A-50C within the internal network 500.

Figure 5:
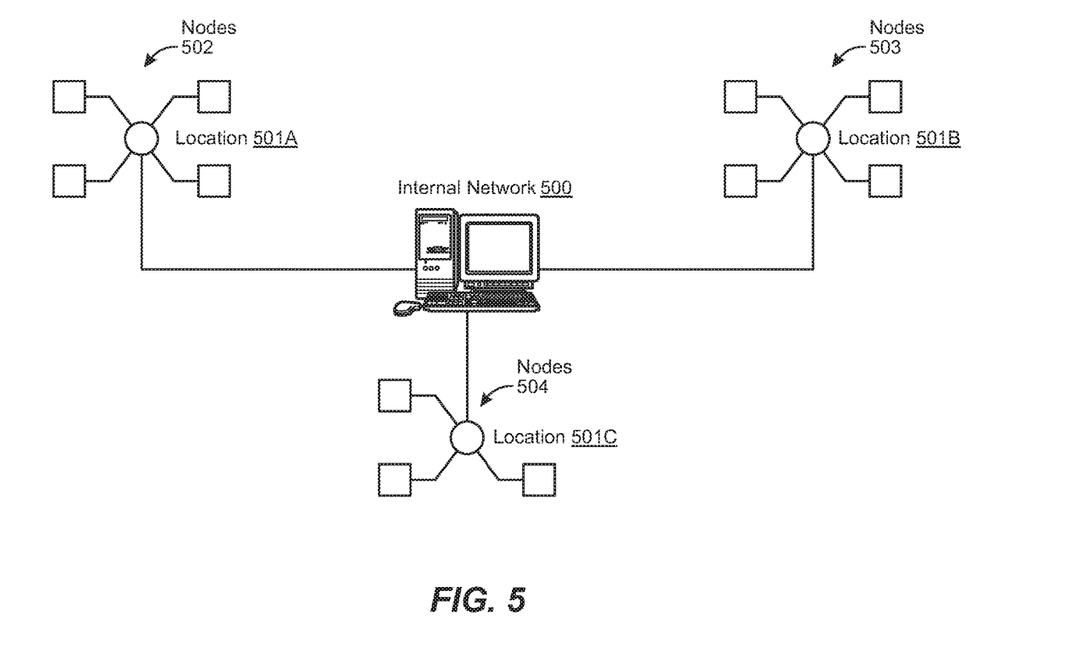
FIG. 5 illustrates an embodiment of a network architecture which involves network nodes located in various locations.

Throughout the mapping process, the network mapping module 107 may identify various nodes 502 at location 501A, nodes 503 at location 501B, and nodes 504 at location 501C. The network mapping module 107 may also be configured to identify a network's architecture including internal nodes and external nodes, routers, gateways, firewalls, wired networks, wireless networks, individual user devices, IOT devices, and other network devices. After the network mapping module 107 has mapped the various locations of the network 500, and after the location determining module 109 has identified the locations of the nodes (e.g., locations 501A-501C), the method 400 may include receiving a request for metadata service information from an application hosted on a cloud server instance (step 430). Method 400 may then include providing a response to the received request for metadata service information if the determined location of the requesting node is approved (step 440A) or may include preventing a response to the received request for metadata service information if the determined location of the requesting node is not approved (440B).

For example, location 501A may be an approved location. As such, metadata service information requests received from nodes 502 may be approved and the metadata service (e.g., 111 of FIG. 1) may provide metadata 117 to the cloud instance 120. This metadata 117 may include network information 112 and/or credential information 113. In some embodiments, all of the nodes from a given location (e.g., 501A) may be approved, while in other embodiments, only a portion of the nodes from a given location may be approved and other nodes at that location are prevented from receiving metadata service information. In such cases, the approved nodes may be nodes of a certain type (e.g., mobile devices), while the unapproved nodes may be of another type. In a similar manner, some or all of the nodes 503 of location 501B of FIG. 5 may be approved while some or all of the nodes 504 of location 501C may be unapproved. In at least some embodiments a managed policy (e.g., 116 of FIG. 1) or IAM policy may be put into place to specify which locations and/or which nodes at each location are approved and which locations and nodes are unapproved. The origin enforcing module 115 may then enforce the rule that only metadata requests originating from approved locations (or approved nodes within those locations) are to be serviced while requests originating from unapproved locations are to be denied.

In some embodiments, the method 400 may include an optional step of generating a list that identifies those internal network nodes that were discovered during the mapping. When the network mapping module 107 is mapping the network (e.g., 500), the computer system may generate a list of nodes 502, 503, and/or 504 that were discovered during the mapping. The generated list may include network addresses including IP addresses or MAC addresses for the nodes identified in the mapping.

If the metadata request 123 is received from a node located in an approved location, the metadata service 111 may provide the requested metadata 117 including potentially credentials 113 used by an application 121 to make API calls or to access data in some other manner. The metadata service information may include static information or dynamically changeable information. The network information 112 and/or the credentials 113 may be static or may be changed or updated from time to time. In some embodiments, the credential information 113 may correspond to an application and the credential information may allow the application to access various APIs for services provided by the cloud server instance 120. In some cases, once the application has generated and sent the API calls using the credential information 113, the method 400 may determine the network location from which the API calls were received and may allow or deny the API call based on the determined network location from which the API call was received.

In some embodiments, when the mapping module 107 of FIG. 1 maps the internal network, the mapping module may further define various regions of the internal network. As noted above the various regions of the internal network may include physically separate portions and/or logically separate portions. In some cases, each region of the internal network may include its own network address translation (NAT) gateway address, virtual private cloud (VPC) identifier, and/or a VPC endpoint identifier. In some embodiments, such as in internal network 600 of FIG. 6, the mapping module may identify different physical buildings that are part of the internal network 600. For instance, the mapping module may determine that buildings 601A, 601B and 601C are part of internal network 600. These buildings may belong to a university, a corporation, a local or state government, or some other entity. The mapping module may identify the physical location of these buildings (based on wireless signals, for example, such as GPS or WiFi) and may then provide these locations to the origin enforcing module 115 of FIG. 1 which may approve or deny requests based on the physical or logical location from which the requests are received.

Figure 6:
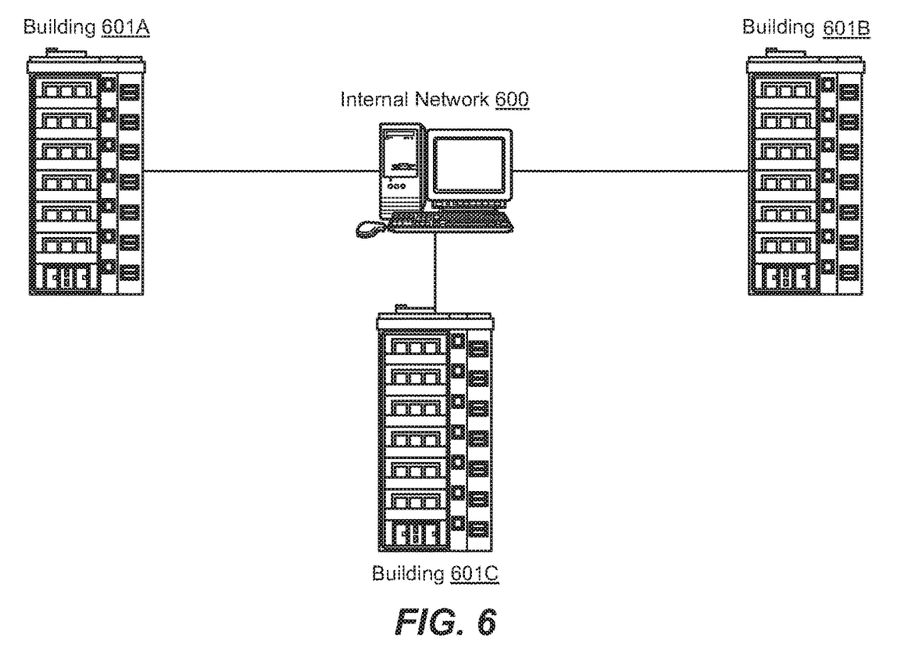
FIG. 6 illustrates an embodiment of an alternative network architecture which involves network nodes located in different buildings.

In FIG. 6, for example, Buildings 601A-601C may be on the approved list, while other surrounding or perhaps more remote buildings are not on the approved list. In other cases, some of the buildings in the internal network 600 may be approved, while others may not. For example, buildings 601B and 601C may be approved, while building 601A is not approved. Thus, metadata service requests from nodes within buildings 601B and 601C may be approved and answered by the metadata service 111, while metadata service requests from nodes in building 601A may be denied. In still further cases some nodes within a building may be allowed while others are denied. The level of granularity may depend on implementation and may be specified in the managed policy 116 or other IAM policy. For instance, nodes from a certain department (e.g., human resources or engineering) may be approved while others are denied. Nodes from a certain floor of a building may be approved while nodes from other floors are denied. Nodes having certain assigned roles or nodes having certain assigned users or certain assigned tasks may be approved or denied as specified in the policy 116. Nodes behind certain firewalls or NAT gateways may be approved, while nodes behind other gateways are denied.

Figure 7:
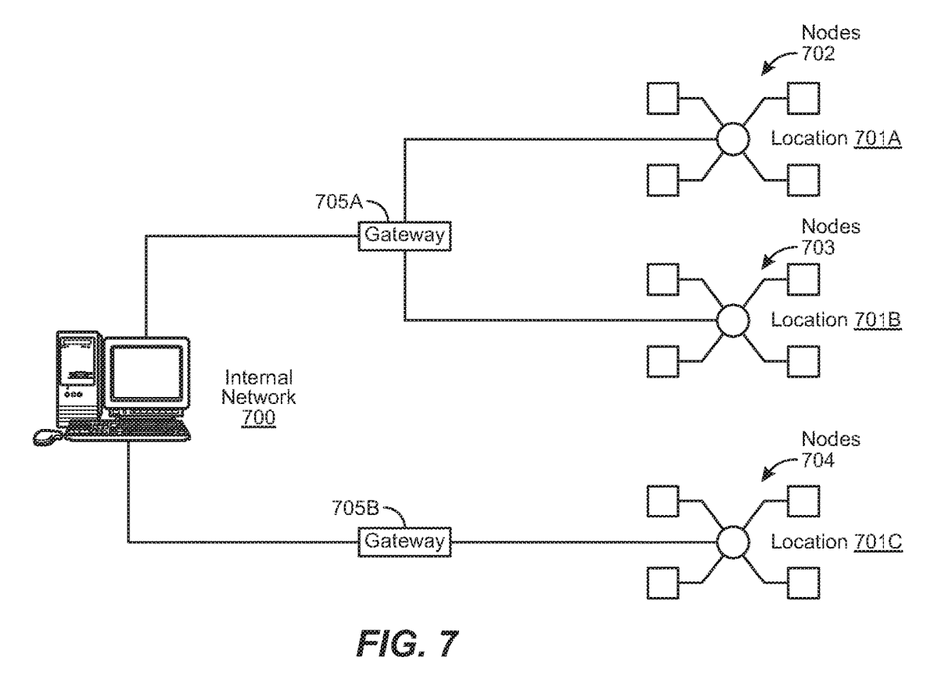
FIG. 7 illustrates an embodiment of an alternative network architecture which involves network nodes located in different logical locations.

For example, as shown in FIG. 7, internal network 700 has identified gateways 705A and 705B. Nodes 702 and 703 of locations 701A and 701B, respectively, lie (logically) behind gateway 705A. Nodes 704 in location 701C lie behind gateway 705B. In some embodiments, nodes 702 and 703 behind gateway 705A may be approved to receive metadata service information, while nodes 704 behind gateway 705B may be denied. Or the reverse may be true where nodes 702 and 703 behind gateway 705A are not approved to receive metadata service information and nodes 704 behind gateway 705B are allowed. Similarly, the managed policy 116 or other IAM policy may indicate that certain specific nodes at given locations are approved, while other specified nodes are not approved. It should be noted that network managers or other users may have full control to customize which nodes or types of nodes or locations of nodes are approved to request and receive metadata service information. Moreover, it should be noted that while certain numbers of buildings or locations or nodes are shown and described in these examples, substantially any number of internal networks, locations, nodes, gateways, policies or other components may be used.

Thus in this manner, the metadata service 111 may condition the response to metadata requests on where the request originated. In some embodiments, the metadata service 111 may also condition a response to the request for metadata service information on receiving valid, up-to-date credentials. In some cases, when a metadata service information requests received at the computer system 101, the request may include credentials 113. For example, an application 121 hosted on cloud server instance 120 may send credentials 113 with an API's request 124 for metadata service information from metadata service 111. These credentials may be analyzed to determine whether they are valid and up-to-date. If they are valid and up-to-date, and if the API call 124 was received from an approved location, the metadata service 111 may provide metadata service information 117 to the application. When determining the location from which the API call originated, the location determining module 109 may identify the public IP address for the cloud server instance and use that public IP address to determine whether the request is from an approved location.

Many other network addresses or identifiers may be used when determining a location from which a metadata service information request originated. Indeed, as mentioned above with regard to FIG. 3, depending on where a node located is within a network, the location determining module of computer system 101 of FIG. 1 may use different network addresses to identify the requester's location. In some embodiments, for example, receiving a request for metadata service information from an application 121 hosted on cloud server instance 120 may include observing a NAT gateway public IP address for the cloud server instance 120. In some cases, receiving a request for metadata service information from an application 121 hosted on cloud server instance 120 may include observing a private IP address for the cloud server instance 120. In some embodiments, the location determining module 109 may observe which virtual private cloud instance (e.g., 120) the request for metadata service information came from among a plurality of cloud instances deployed on an external subnet with a public IP address. In some cases, the location determining module 109 may observe which virtual private cloud the request for metadata service information came from among a plurality of virtual cloud instances deployed on an internal subnet with a private IP address. Other network identifiers may additionally or alternatively be used depending on network architecture.

In some embodiments, the above-described method may be encoded as computer-readable instructions on a computer-readable medium. For example, a computer-readable medium may include one or more computer-executable instructions that, when executed by at least one processor of a computing device, may cause the computing device to map at least a portion of an internal network to identify various nodes of the internal network, determine where the internal network nodes identified in the mapping are located, receive a request for metadata service information from an application hosted on a cloud server instance provide a response to the received request for metadata service information if the determined location of the requesting node is approved or prevent a response to the received request for metadata service information if the determined location of the requesting node is not approved.

In addition, a corresponding system for protecting credentials in a cloud environment may include at least one physical processor and physical memory comprising computer-executable instructions that, when executed by the physical processor, may cause the physical processor to: map at least a portion of an internal network to identify various nodes of the internal network, determine where the internal network nodes identified in the mapping are located, receive a request for metadata service information from an application hosted on a cloud server instance provide a response to the received request for metadata service information if the determined location of the requesting node is approved or prevent a response to the received request for metadata service information if the determined location of the requesting node is not approved.

Accordingly, in this manner, systems and methods may be provided for protecting credentials in cloud environment. The systems and methods described herein may map out internal networks, determine where the various nodes are located (either physically or logically) and may generate a list of which node locations are approved and which locations are not approved to receive metadata service information. Then, when metadata service requests or API calls come in from various locations, the methods and systems described herein may determine where those requests or calls came from and may allow or prevent responses to the requests or calls based on where those requests or calls originated. Managed policies may specify details about which nodes or node types are approved from each location.

1. A computer-implemented method for protecting credentials in a cloud environment comprising: mapping at least a portion of an internal network to identify one or more nodes of the internal network; determining where one or more of the internal network nodes identified in the mapping are located; receiving a request for metadata service information from an application hosted on a cloud server instance; and preventing a response to the received request for metadata service information if the determined location of the requesting node is not approved.

2. The computer-implemented method of claim 1, further comprising generating a list that identifies those internal network nodes that were discovered during the mapping, the generated list including network addresses for the nodes identified in the mapping.

3. The computer-implemented method of claim 1, wherein the metadata service information includes at least one of static information or dynamically changeable information.

4. The computer-implemented method of claim 1, wherein the metadata service information comprises credential information for the application.

5. The computer-implemented method of claim 4, wherein the credential information for the application allows the application to access one or more application programming interfaces (APIs) for services provided by the cloud server instance.

6. The computer-implemented method of claim 5, further comprising:
determining the network location from which at least one of the API calls is received; and allowing or denying the API call based on the determined network location from which the at least one API call was received.

7. The computer-implemented method of claim 1, wherein the location of the network nodes comprises a physical location.

8. The computer-implemented method of claim 1, wherein the location of the network nodes comprises a logical location within the internal network.

9. The computer-implemented method of claim 1, further comprising creating a managed policy that describes one or more regions within the internal network.

10. The computer-implemented method of claim 9, wherein the regions are designated within the managed policy as being approved or being not approved for receiving metadata service information.

11. A system comprising: at least one physical processor physical memory comprising computer-executable instructions that, when executed by the physical processor, cause the physical processor to: map at least a portion of an internal network to identify one or more nodes of the internal network; determine where one or more of the internal network nodes identified in the mapping are located; receive a request for metadata service information from an application hosted on a cloud server instance; and prevent a response to the received request for metadata service information if the determined location of the requesting node is not approved.

12. The system of claim 11, wherein mapping at least a portion of an internal network to identify one or more nodes of the internal network comprises defining one or more regions for the internal network.

13. The system of claim 12, wherein each region of the internal network includes at least one of a network address translation (NAT) gateway address, a virtual private cloud (VPC) identifier, or a VPC endpoint identifier.

14. The system of claim 11, wherein providing a response to the request for metadata service information is further conditioned on receiving valid, up-to-date credentials.

15. The system of claim 11, wherein receiving a request for metadata service information from an application hosted on a cloud server instance further comprises observing a public Internet protocol (IP) address for the cloud server instance.

16. The system of claim 11, wherein receiving a request for metadata service information from an application hosted on a cloud server instance further comprises observing a NAT gateway public IP address for the cloud server instance.

17. The system of claim 11, wherein receiving a request for metadata service information from an application hosted on a cloud server instance further comprises observing a private IP address for the cloud server instance.

18. The system of claim 17, further comprising observing which virtual private cloud the request for metadata service information came from for cloud instances deployed on an external subnet with a public IP address.

19. The system of claim 17, further comprising observing which virtual private cloud the request for metadata service information came from for cloud instances deployed on an internal subnet with a private IP address.

20. A non-transitory computer-readable medium comprising one or more computer-executable instructions that, when executed by at least one processor of a computing device, cause the computing device to: map at least a portion of an internal network to identify one or more nodes of the internal network; determine where one or more of the internal network nodes identified in the mapping are located; receive a request for metadata service information from an application hosted on a cloud server instance; and prevent a response to the received request for metadata service information if the determined location of the requesting node is not approved.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data requests to be transformed, transform the data requests, output a result of the transformation to determine an origin for the requests, use the result of the transformation to allow or prevent access to resources, and store the result of the transformation to make further determinations. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

I claim:

1. A computer-implemented method for protecting credentials in a cloud environment comprising:
    mapping at least a portion of an internal network to identify one or more nodes of the internal network, each node comprising a specific type of electronic device including at least one of a mobile electronic device, a personal computer, or a server node;
    determining where one or more of the internal network nodes identified in the mapping are located, wherein a first subset of the internal network nodes at the determined location are permitted to receive metadata service information and wherein a second subset of the internal network nodes at the determined location are prevented from receiving metadata service information, wherein the manner in which the internal network nodes' location is determined is variable based on where a request for metadata service information originated;
    receiving the request for metadata service information from an application hosted on a cloud server instance that is provisioned on at least one of the internal network nodes, wherein the cloud server instance is associated with a specified user role, the user role having associated therewith a plurality of computing systems at various locations within the internal network; and
    preventing a response to the received request for metadata service information if the requesting internal network node is part of the second subset of the internal network nodes located at the determined location, if the requesting internal network node is identified as being associated with the specified user role, and if the requesting internal network node is identified as being a specific type of electronic device.

2. The computer-implemented method of claim 1, further comprising generating a list that identifies those internal network nodes that were discovered during the mapping, the generated list including network addresses for the nodes identified in the mapping.

3. The computer-implemented method of claim 1, wherein the metadata service information includes at least one of static information or dynamically changeable information.

4. The computer-implemented method of claim 1, wherein the metadata service information comprises credential information for the application.

5. The computer-implemented method of claim 4, wherein the credential information for the application allows the application to access one or more application programming interfaces (APIs) for services provided by the cloud server instance.

6. The computer-implemented method of claim 5, further comprising:
    determining the network location from which at least one of the API calls is received; and
    allowing or denying the API call based on the determined network location from which the at least one API call was received.

7. The computer-implemented method of claim 1, wherein the location of the network nodes comprises a physical location.

8. The computer-implemented method of claim 1, wherein the location of the network nodes comprises a logical location within the internal network.

9. The computer-implemented method of claim 1, further comprising creating a managed policy that describes one or more regions within the internal network.

10. The computer-implemented method of claim 9, wherein the regions are designated within the managed policy as being approved or being not approved for receiving metadata service information.

11. The computer-implemented method of claim 1, wherein the variable manner in which the internal network nodes' location is determined is based on at least one of a public IP address of the internal network node, a network address translation (NAT) IP address, a virtual private cloud (VPC) endpoint IP address, or a private link address.

12. A system comprising:
    at least one physical processor;
    physical memory comprising computer-executable instructions that, when executed by the physical processor, cause the physical processor to:
        map at least a portion of an internal network to identify one or more nodes of the internal network, each node comprising a specific type of electronic device including at least one of a mobile electronic device, a personal computer, or a server node;
        determine where one or more of the internal network nodes identified in the mapping are located, wherein a first subset of the internal network nodes at the determined location are permitted to receive metadata service information and wherein a second subset of the internal network nodes at the determined location are prevented from receiving metadata service information, wherein the manner in which the internal network nodes' location is determined is variable based on where a request for metadata service information originated;
        receive the request for metadata service information from an application hosted on a cloud server instance that is provisioned on at least one of the internal network nodes, wherein the cloud server instance is associated with a specified user role, the user role having associated therewith a plurality of computing systems at various locations within the internal network; and
        prevent a response to the received request for metadata service information if the requesting internal network node is part of the second subset of the internal network nodes located at the determined location, if the requesting internal network node is identified as being associated with the specified user role, and if the requesting internal network node is identified as being a specific type of electronic device.

13. The system of claim 12, wherein mapping at least a portion of an internal network to identify one or more nodes of the internal network comprises defining one or more regions for the internal network.

14. The system of claim 13, wherein each region of the internal network includes at least one of a network address translation (NAT) gateway address, a virtual private cloud (VPC) identifier, or a VPC endpoint identifier.

15. The system of claim 12, wherein preventing the response to the request for metadata service information is further conditioned on receiving valid, up-to-date credentials.

16. The system of claim 12, wherein receiving a request for metadata service information from an application hosted on a cloud server instance further comprises observing a public internet protocol (IP) address for the cloud server instance.

17. The system of claim 12, wherein receiving a request for metadata service information from an application hosted on a cloud server instance further comprises observing a NAT gateway public IP address for the cloud server instance.

18. The system of claim 12, wherein receiving a request for metadata service information from an application hosted on a cloud server instance further comprises observing a private IP address for the cloud server instance.

19. The system of claim 18, further comprising observing which virtual private cloud the request for metadata service information came from for cloud instances deployed on an external subnet with a public IP address.

20. A non-transitory computer-readable medium comprising one or more computer-executable instructions that, when executed by at least one processor of a computing device, cause the computing device to:

map at least a portion of an internal network to identify one or more nodes of the internal network, each node comprising a specific type of electronic device including at least one of a mobile electronic device, a personal computer, or a server node;

determine where one or more of the internal network nodes identified in the mapping are located, wherein a first subset of the internal network nodes at the determined location are permitted to receive metadata service information and wherein a second subset of the internal network nodes at the determined location are prevented from receiving metadata service information, wherein the manner in which the internal network nodes' location is determined is variable based on where a request for metadata service information originated;

receive the request for metadata service information from an application hosted on a cloud server instance that is provisioned on at least one of the internal network nodes, wherein the cloud server instance is associated with a specified user role, the user role having associated therewith a plurality of computing systems at various locations within the internal network; and prevent a response to the received request for metadata service information if the requesting internal network node is part of the second subset of the internal network nodes located at the determined location, if the requesting internal network node is identified as being associated with the specified user role, and if the requesting internal network node is identified as being a specific type of electronic device.

* * * * *